(12) United States Patent
Funt et al.

(10) Patent No.: US 11,544,894 B2
(45) Date of Patent: Jan. 3, 2023

(54) LATENCY-RESILIENT CLOUD RENDERING

(71) Applicant: Meta Platforms Technologies, LLC, Menlo Park, CA (US)

(72) Inventors: Brian Funt, West Vancouver (CA); Reza Nourai, Danville, CA (US); Volga Aksoy, Redwood City, CA (US); Zeyar Htet, San Mateo, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/187,624

(22) Filed: Feb. 26, 2021

(65) Prior Publication Data

US 2022/0277510 A1 Sep. 1, 2022

(51) Int. Cl.
*G06T 15/20* (2011.01)
*G06N 3/08* (2006.01)
*G06N 3/04* (2006.01)

(52) U.S. Cl.
CPC .............. *G06T 15/20* (2013.01); *G06N 3/04* (2013.01); *G06N 3/08* (2013.01)

(58) Field of Classification Search
CPC combination set(s) only.
See application file for complete search history.

(56) References Cited

U.S. PATENT DOCUMENTS

| 11,094,075 | B1 * | 8/2021 | Lanman | G06N 3/084 |
| 2002/0158873 | A1 | 10/2002 | Williamson | |
| 2004/0151390 | A1 | 8/2004 | Iwamura | |
| 2008/0001962 | A1 | 1/2008 | Lefebvre et al. | |
| 2009/0208110 | A1 | 8/2009 | Hoppe et al. | |
| 2015/0269785 | A1 * | 9/2015 | Bell | G06T 15/20 345/427 |
| 2017/0227765 | A1 | 8/2017 | Mammou et al. | |
| 2019/0066370 | A1 | 2/2019 | Schmalstieg et al. | |
| 2019/0098278 | A1 * | 3/2019 | Koizumi | H04N 13/243 |
| 2020/0020150 | A1 | 1/2020 | Johansson et al. | |

(Continued)

OTHER PUBLICATIONS

Mildenhall, et al., NeRF: Representing Scenes as Neural Radiance Fields for View Synthesis, ECCV 2020, 25 pages, Aug. 3, 2020.

(Continued)

*Primary Examiner* — Andrew G Yang
(74) *Attorney, Agent, or Firm* — Baker Botts L.L.P.

(57) ABSTRACT

A method includes the steps of receiving training data comprising images of an object and associated camera poses from which the images are captured, training, based on the training data, a machine-learning model to take as input a given viewpoint and synthesize an image of a virtual representation of the object viewed from the given viewpoint, generating, for each of predetermined viewpoints surrounding the virtual representation of the object, a view-dependent image of the object as viewed from that viewpoint using the trained machine-learning model, receiving, from a client device, a desired viewpoint from which to view the virtual representation of the object, selecting one or more of the predetermined viewpoints based on the desired viewpoint, and sending, to the client device, the view-dependent images associated with the selected one or more viewpoints for rendering an output image of the virtual representation of the object viewed from the desired viewpoint.

20 Claims, 14 Drawing Sheets

(56) References Cited

U.S. PATENT DOCUMENTS

| | | | | |
|---|---|---|---|---|
| 2020/0175759 | A1* | 6/2020 | Russell | G06N 20/00 |
| 2020/0364926 | A1 | 11/2020 | Mueller et al. | |
| 2021/0264166 | A1* | 8/2021 | Slutsky | G06V 20/56 |
| 2021/0390761 | A1* | 12/2021 | Kowalski | G06T 17/10 |
| 2021/0392313 | A1* | 12/2021 | Kimura | G06N 3/08 |

OTHER PUBLICATIONS

Zhou, et al., Stereo Magnification: Learning View Synthesis using Multiplane Images, ACM Trans. Graph., vol. 37, No. 4, Article 65, 12 pages, Aug. 2018.

International Search Report and Written Opinion for International Application No. PCT/US2022/012691, dated Jun. 7, 2022, 10 pages.

Mildenhall B., et al., "Local Light Field Fusion: Practical View Synthesis with Prescriptive Sampling Guidelines," ACM Transactions on Graphics (TOG), Jul. 12, 2019, vol. 38 (4), pp. 1-14.

Wang Q., et al., "IBRNet: Learning Multi-View Image-Based Rendering," Arxiv.Org, Cornell University Library, Feb. 25, 2021, pp. 4690-4699.

Yu A., et al., "pixelNeRF: Neural Radiance Fields from One or Few Images," arXiv, 2020, 20 pages, https://arxiv.org/abs/2012.02190.

Broxton M., et al., "Immersive Light Field Video with a Layered Mesh Representation," ACM Transactions on Graphics, Article 86, Jul. 2020, vol. 39 (4), 15 pages.

Carr., et al., "Meshed Atlases for Real-Time Procedural Solid Texturing," ACM Transactions on Graphics, Apr. 2002, vol. 21 (2), 26 pages.

Ernst, "Open Sourcing Seurat: bringing high-fidelity scenes to mobile VR," Google Developers, May 4, 2018, 4 pages.

Goldlucke B., et al., "Real-Time Microfacet Billboarding for Free-Viewpoint Video Rendering," Proceedings 2003 International Conference on Image Processing (Cat No. 03CH37429), IEEE, Sep. 14, 2003, vol. 3, pp. 713-716.

International Search Report and Written Opinion for International Application No. PCT/US2021/055785 dated Apr. 28, 2022, 9 pages.

Kamburelis M., "Shadow Maps and Projective Texturing in X3D," 15th International Conference on Web 3D Technology, Jul. 24, 2010, pp. 17-26.

Mueller., et al., "Shading Atlas Streaming," ACM Transactions on Graphics, Article 199, Nov. 2018, vol. 37 (6), 16 pages.

International Search Report and Written Opinion for International Application No. PCT/US2022/022217 dated Jul. 15, 2022, 11 pages.

Mayer A.J., "Virtual Texturing," Retrieved from Internet: https://www.cg.tuwien.ac.at/research/publications/2010/Mayer-2010-VT/Mayer-2010-VT-Thesis.pdf, Oct. 14, 2010, 113 pages.

Mittring M., et al., "Advanced Virtual Texture Topics," SIGGRAPH '08: ACM SIGGRAPH 2008 Games, Aug. 11, 2008, pp. 23-51.

\* cited by examiner

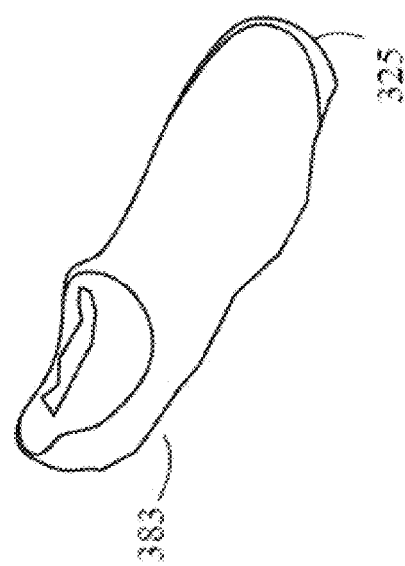
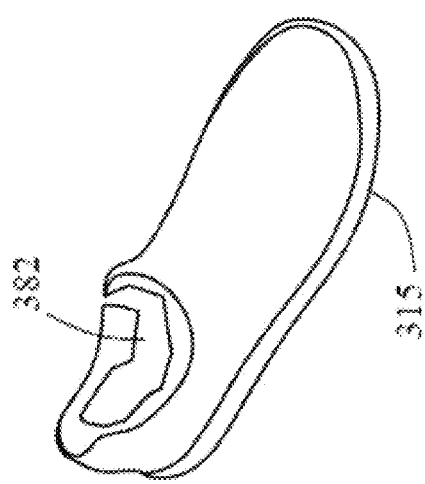
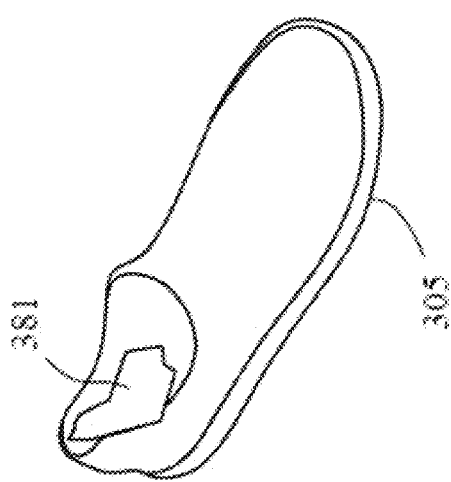
FIG. 3B

1100

1110 receiving training data comprising images of an object and associated camera poses from which the images are captured

↓

1120 training, based on the training data, a machine-learning model to take as input a given viewpoint and synthesize an image of a virtual representation of the object as viewed from the given viewpoint

↓

1130 generating, for each of a predetermined plurality of viewpoints surrounding the virtual representation of the object, a view-dependent image of the object as viewed from that viewpoint using the trained machine-learning model

↓

1140 receiving, from a client device, a desired viewpoint from which to view the virtual representation of the object

↓

1150 selecting one or more of the predetermined plurality of viewpoints based on the desired viewpoint

↓

1160 sending, to the client device, the view-dependent images associated with the selected one or more viewpoints for rendering an output image of the virtual representation of the object viewed from the desired viewpoint

*FIG. 11*

LATENCY-RESILIENT CLOUD RENDERING

TECHNICAL FIELD

This disclosure generally relates to rendering Augmented-Reality (AR) or Virtual-Reality (VR) content on user devices. This disclosure generally relates to storing and rendering AR/VR content on a cloud architecture.

BACKGROUND

Virtual reality is a computer-generated simulation of an environment (e.g., a 3D environment) that users can interact with in a seemingly real or physical way. A virtual reality system, which may be a single device or a group of devices, may generate this simulation for display to a user, for example, on a virtual reality headset or some other display device. The simulation may include images, sounds, haptic feedback, and/or other sensations to imitate a real or imaginary environment. As virtual reality becomes more and more prominent, its range of useful applications is rapidly broadening. The most common applications of virtual reality involve games or other interactive content, but other applications such as the viewing of visual media items (e.g., photos, videos) for entertainment or training purposes are close behind. The feasibility of using virtual reality to simulate real-life conversations and other user interactions is also being explored.

Augmented reality provides a view of the real or physical world with added computer-generated sensory inputs (e.g., visual, audible). In other words, computer-generated virtual effects may augment or supplement the real-world view. For example, a camera on a virtual reality headset may capture a real-world scene (as an image or video) and display a composite of the captured scene with computer-generated virtual objects. The virtual objects may be, for example, two-dimensional and/or three-dimensional objects, and may be stationary or animated.

BRIEF DESCRIPTION OF THE DRAWINGS

FIGS. 3A-3B illustrate the process of rendering an image of a virtual object based on rendering data.

FIG. 11 illustrates an example method for rendering an image of a virtual object from a desired viewpoint based on images obtained from a machine-learning model.

SUMMARY OF PARTICULAR EMBODIMENTS

Figure 1:
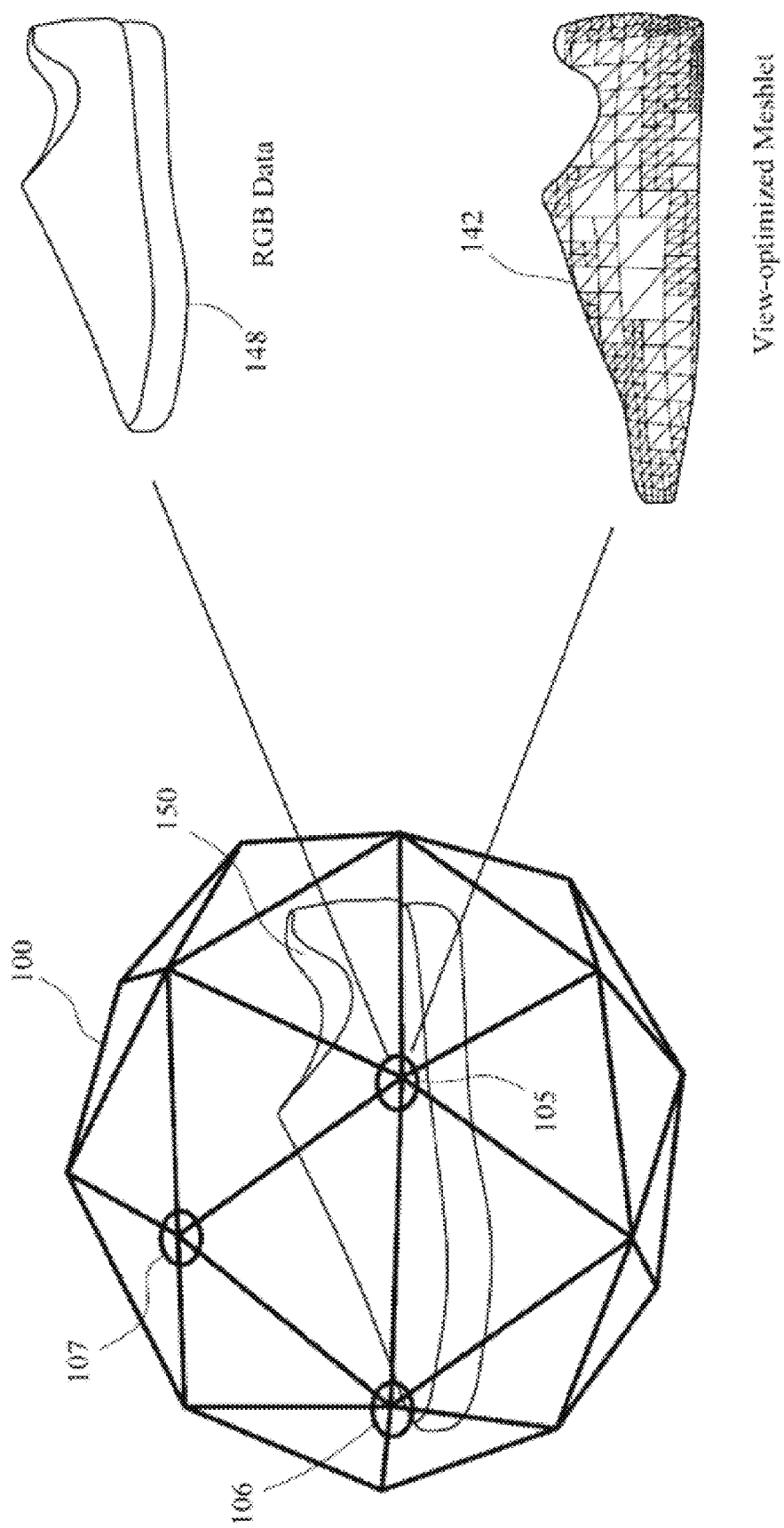
FIG. 1 illustrates an example of a view hierarchy surrounding an object.

The invention of this disclosure is directed to addressing problems associated with providing high-quality AR/VR content to light-weight, low-cost or resource-constrained devices, such as mobile phones and AR/VR headsets. The invention aims to provide a latency-resilient AR/VR experience by utilizing cloud rendering for the bulk of intensive computing while leveraging local reconstruction on a user device so the latency for the final rendering is largely decoupled from network conditions. Traditional cloud-rendering approaches use a server to perform all rendering tasks and send only the final video stream to the client device. But due to latency caused by the rendering process and network transmission, by the time the video is displayed to the user, the viewpoint used by the server to render the video would likely be different from the viewpoint of the user. The difference in the viewpoints would manifest as lag, and the lag would become especially pronounced when the geometry of the virtual object is complex and the network condition is poor. To address these issues, the invention uses a server (e.g., cloud) to perform the computationally expensive rendering tasks and encodes artifacts of 3D objects (e.g., simplified geometry and RGB data). Those artifacts are then sent to and used by the user device to reconstruct an image of the object using the most up-to-date viewpoint of the user.

One method of performing computationally expensive rendering tasks on the server involves generating a model of a real-world object, or a scene, that is configured to output data corresponding to the geometrical and reflectance properties of the object from various viewpoint surrounding the object (e.g., view-dependent images). The method may involve leveraging recent machine learning techniques that have been successful in generating models of object or scene by utilizing a neural network to represent a neural radiance field ("NeRF") of the objects or scenes from multiple photographs taken from different positions. See Ben Mildenhall, Pratul P Srinivasan, Matthew Tancik, Jonathan T Barron, Ravi Ramamoorthi, and Ren Ng., *Nerf: Representing scenes as neural radiance fields for view synthesis*, In ECCV, 2020. However, while those machine learning techniques are able to output view-dependent images from various viewpoints, they are too computationally intensive and slow to be applicable for real-time AR/VR rendering on client devices. To remedy such deficiencies, the disclosure of this Application discloses methods that combine the post-processing of machine-learning models that are trained to learn the radiance fields of objects with other novel techniques disclosed herein, which may involve generating various viewpoints surrounding an object based on view-dependent data obtained from the machine-learning models then selectively providing portions of the view-dependent data to a client device to allow the device to reconstruct an image of an object using the most up-to-date viewpoint.

Certain embodiments of this invention provide methods for encoding a virtual object based on various viewpoints surrounding an object. In some embodiments, each viewpoint is generated with a simplified geometric representation of an object from that viewpoint and an associated view-dependent texture (e.g., rendering data). The simplified geometric representations and associated view-dependent textures are provided separately to client devices, allowing them to locally render an image based on a combination of the simplified geometric representation and the associated view-dependent texture. In other embodiments, each viewpoint is generated with a pre-rendered image of the object (e.g., based on radiance fields) and are provided to the client devices when the images become applicable to their camera view. After generating the various viewpoints surrounding the object, viewpoints that are relevant to a user could be determined and data associated with the relevant viewpoints (e.g., simplified geometric representation and view-dependent texture, or pre-rendered image) may be provided to the user device. The user device may then reconstruct the object from the user's viewpoint based on the received data.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

The invention of this disclosure presents a method of encoding objects based on a view-dependent architecture called the "view hierarchy." A view hierarchy is a layout of multiple viewpoints surrounding an object, each viewpoint being associated with a representation of the object that captures the object's geometry and texture from that viewpoint. FIG. 1 illustrates an example of a view hierarchy 100 surrounding an object 150. Each vertex of the view hierarchy 100 represents a viewpoint from that point in space, three of which are illustrated as viewpoints 105, 106, and 107. In particular embodiments, the viewpoints of a view hierarchy are distributed based on an equirectangular layout, similar to a globe of the Earth. The viewpoints of the view hierarchy may be distributed in a way such that the largest number of viewpoints are distributed around the equator, or 0 degree latitude, and decreasing number of viewpoints are distributed along other non-zero degree latitudes further they are away from the equator. In other embodiments, the viewpoints of a view hierarchy may be distributed based on different layouts, such as a geodesic distribution. In particular embodiments, a view hierarchy may be comprised of multiple triangles called "view triangles," each triangle formed by three viewpoints. For example, FIG. 1 illustrates a view triangle formed by viewpoints 105, 106, and 107. In the embodiment illustrated in FIG. 1, the view hierarchy 100 is comprised of a single layer of viewpoints surrounding the object 150, such that all the viewpoints are placed a fixed distance away from the center of the object 150. In other embodiments, a view hierarchy may be comprised of two or more layers, such that the viewpoints of different layers are placed at different distances away from the center of an object. If, for example, a view hierarchy is comprised of two layers, viewpoints in the first layer may be distributed so the first layer is comprised of multiple view triangles, and additional viewpoints may be distributed in the second layer so they form "view tetrahedrons" with the view triangles from the first layer. Embodiments with multiple layers of viewpoints may be advantageous since an object can be encoded based on viewpoints of different depths.

A virtual object may be encoded by generating a representation of the object from each of the viewpoints surrounding the object (e.g., a view hierarchy). In particular embodiments, each representation associated a viewpoint may include two types of data: (1) "surface proxy" or "meshlet," which represents a simplified representation of the object's geometry from the viewpoint; and (2) RGB data, which represents the view-dependent texture of the meshlet. For example, FIG. 1 illustrates meshlet 142 and RGB data 148 corresponding to viewpoint 105 of the view hierarchy 100.

A meshlet is a fragment of the object's geometry that represents the overall volume and shape of the object from a specific viewpoint (or set of viewpoints) based on depth information. A meshlet only represents a portion of the object from a viewpoint, so moving around behind the meshlet will reveal that it is an empty shell. In other words, a meshlet is a simplified geometry of the original object's complex geometry and is derived from depth data. Thus, the density and quality of the meshlet is impacted by depth buffer resolution, not geometric complexity of the object. In particular embodiments, a meshlet may be produced by leveraging a rasterization process. Starting with a sparse grid (e.g., 128×128 pixel) overlaying a depth buffer, the range of depth values associated with each cell of the grid (e.g., minimum and maximum depth values) are evaluated to determine the appropriate size of the cell. If the range of depth values associated with any one cell is too large to be represented by the cell, the cell may be subdivided evenly into quarters in a recursive manner until each of the subdivided cells is appropriately sized for the range of depth values associated with the cell, or until the cell reaches the minimum cell size (e.g., 2×2 pixels). Once the appropriate sizes for the cells are determined, each of the cells are divided into two triangles by inserting a diagonal line through the cell (in some embodiments, the cells may be divided into a polygon shape different than a triangle). If any of the triangle's vertices extend beyond a cutoff threshold, the triangles may be discarded. This means that the number of triangles resulting from any one cell could be none, one, or two. Once the triangles are generated, a depth cliff filter may be applied by further discarding any triangles with slopes (e.g., depth delta) that are beyond a workable range. For all remaining triangles, the vertices of the triangles are mapped to x and y values of a x-y coordinate space and z value based on the depth buffer. This meshlet generating method eliminates all the empty space that are not part of the object and dynamically adjusts the triangle density to adapt to areas where the depth complexity is highest (e.g., edges). FIG. 1 illustrates an example meshlet 142 produced by this method. Meshlets do not need to be recomputed or updated unless the geometry of the object changes, thus, generally, meshlets can be pre-computed and saved in a "ready to consume" fashion. In particular embodiments, the meshlets corresponding to the several viewpoints may be combined to generate a single unified meshlets. For example, the meshlets of the primary views may be combined as a single unified meshlet that represents a simplified geometry of the object from all three viewpoints (e.g., view triangle).

RGB data is a texture rendering of an object from the perspective of a viewpoint (e.g., view-dependent texture). The meshlet and RBG data are designed such that, when combined based on the methods described herein, the resulting image would be virtually indistinguishable from the original object rendering. In particular embodiments, instead of rendering separate RGB data for each individual viewpoints, a higher-quality RGB data may be rendered for several nearby viewpoints. This is possible because RGB data of several nearby viewpoints may not differ substantially from each other (e.g., texture of an object from any one viewpoint often looks similar from those of nearby viewpoints). In particular embodiments, a server may analyze the user's position and trajectory in a virtual environment then provide meshlets and RGB data (corresponding to viewpoints of a view hierarchy) that the user may need for reconstructing an object.

Figure 2:
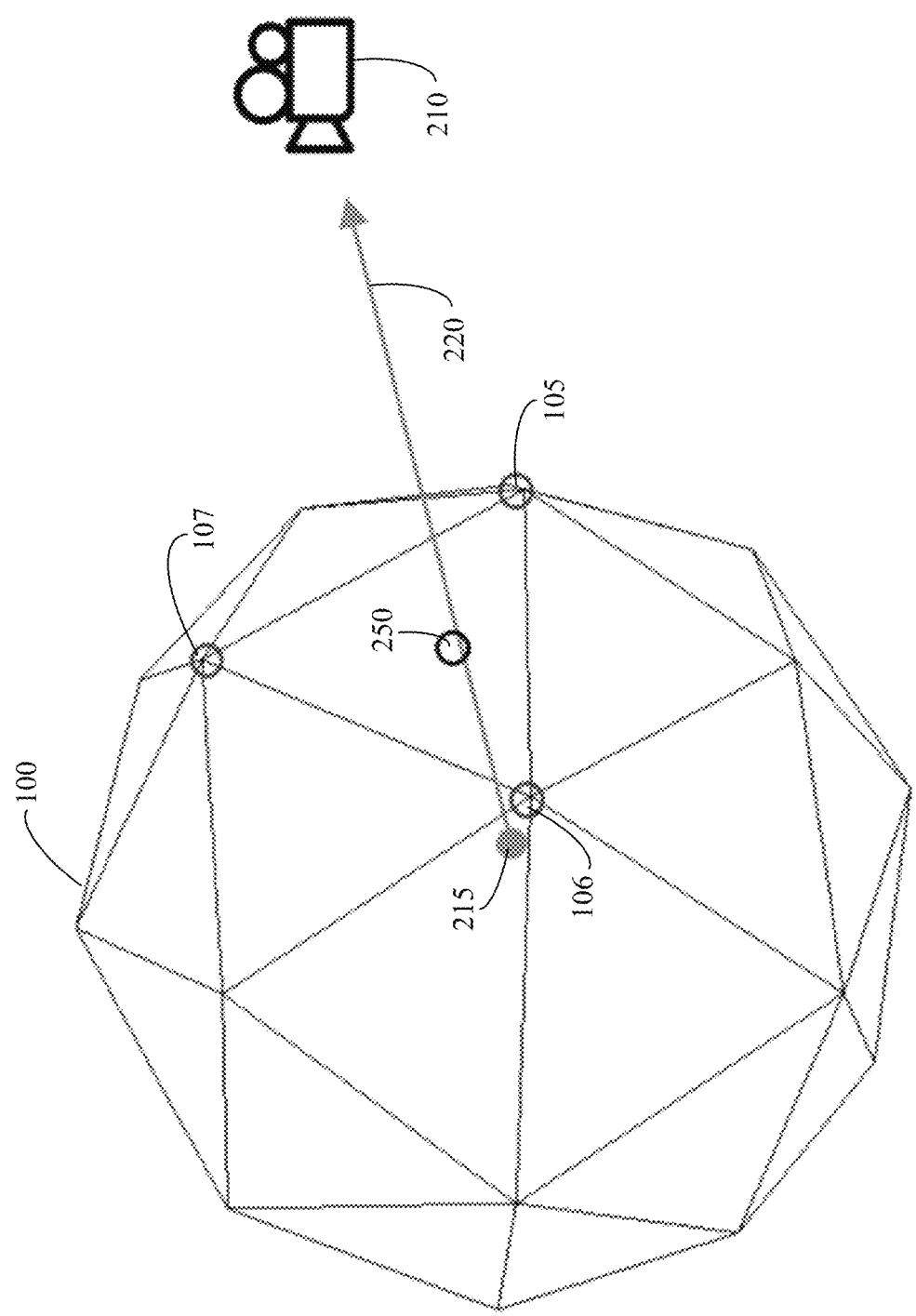
FIG. 2. illustrates an example of a view hierarchy and a user's viewpoint.

The reconstruction process of an object is performed locally by a user device based on a view hierarchy of the object. In particular embodiments, the reconstruction process involves determining a user's viewpoint with respect to the view hierarchy of the object by projecting a ray from the user's viewpoint to the center of the object and determining the point at which the ray intersects the view hierarchy (referred to as the "hit point"). For example, FIG. 2 illustrates a ray 220 projected between a user's viewpoint 210 (e.g., a virtual camera location) and the center point of the object 215. The point at which the ray 220 intersects the view hierarchy 100 is referred to as the hit point 250. Next, the view triangle enclosing the hit point 250 is identified and the three viewpoints forming the view triangle are selected as "primary views" (e.g., viewpoints 105, 106, and 107). Then, the barycentric coordinate of the user's viewpoint 210 with respect to the view triangle (formed by the primary views) may be determined. As explained more below, the reconstruction process performed by a device may involve rendering, for each of the primary views, an image of the object from the user's viewpoint based on the meshlets and RGB data corresponding to the primary view, then blending the images based on the barycentric coordinate of the user's viewpoint with respect to the primary views.

Figure 3A:
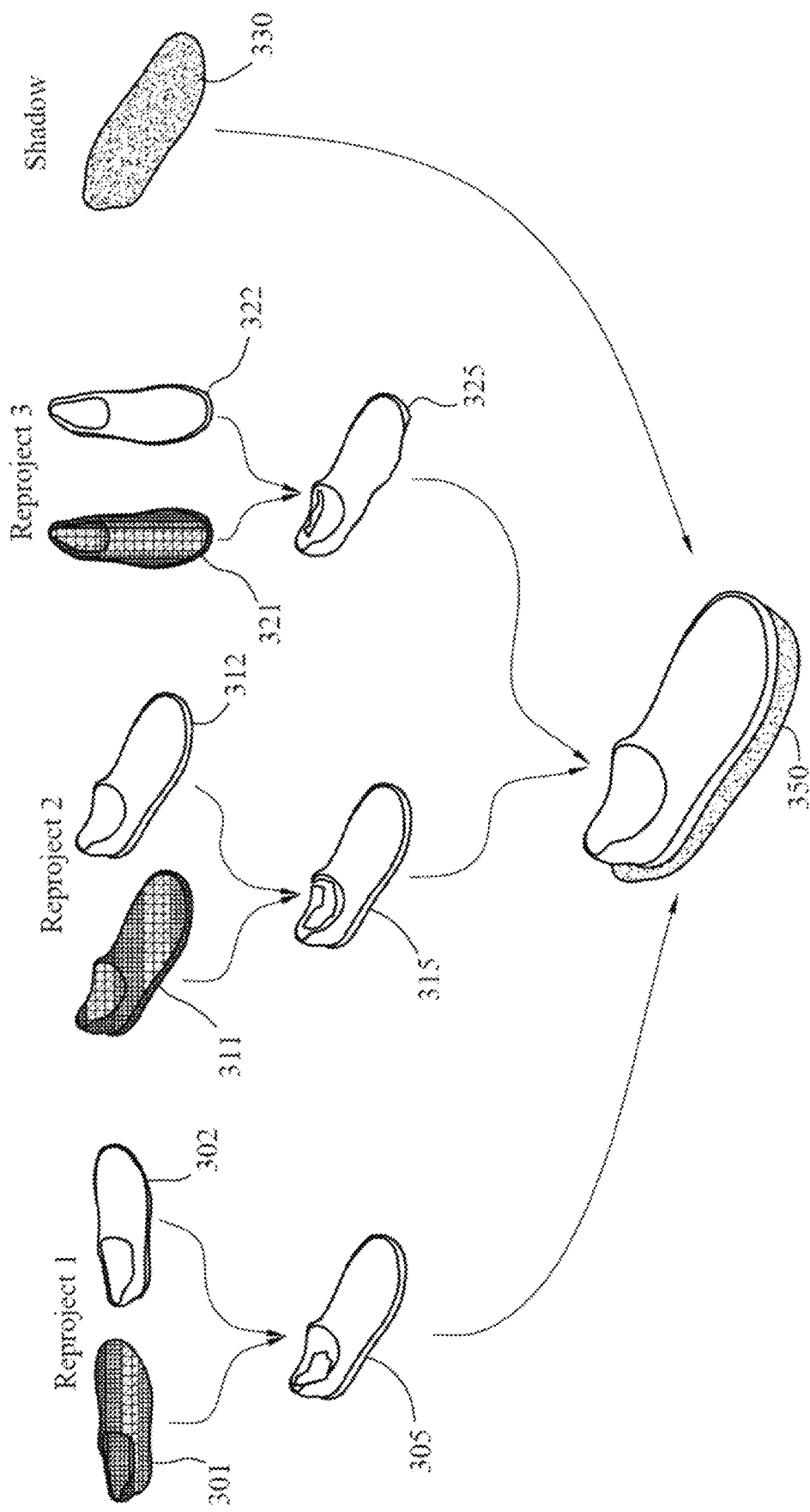

FIGS. 3A-3B illustrate the process of rendering, for each of the primary views, an image of the object from a user's viewpoint based on the meshlets and RGB data corresponding to the primary view (e.g., the object is reprojected from the user's viewpoint), then reconstructing the object by combining the reprojected images. For example, FIG. 3A illustrates a reprojection pass for each of the primary views ("Reproject 1," "Reproject 2," and "Reproject 3"), in which meshlets and RGB data corresponding to the primary views are rendered into reprojected images of the object from the primary views. Meshlet 301 and RGB data 302 are illustrated as being rendered into reprojected image 305, meshlet 311 and RGB data 312 are illustrated as being rendered into reprojected image 315, and meshlet 321 and RGB data 322 are illustrated as being rendered into projected image 325. In particular embodiments, each of the three reprojection passes may be processed in a separate framebuffer. Each reprojection pass by itself may not be able to fully reconstruct the object because the viewpoints associated with the primary views may differ from a user's viewpoint (e.g., some portions of the object, as viewed from the user's viewpoint, may not be visible from the primary views). Thus, FIG. 3B illustrates reprojected images 305 and 315 missing the object's inside portions 381 and 382, respectively, and reprojected image 325 missing the object's bottom portion 383. After the three reprojection images are generated, a combination pass may be performed using a custom blending operation, in which the three framebuffers comprising the reprojected images are combined based on barycentric weights (e.g., determined based the barycentric coordinate of the user's viewpoint with respect to the primary views). For example, FIG. 3A illustrates the reconstructed image 350 that has been generated by blending the three reprojected images together. In particular embodiments, the custom blending operation may remove portions of the object from the reconstructed image, thereby creating "holes" in the object, if some of the approximations of the object's geometry are associated with low-confidence levels. In such cases, a stencil-based hole filling pass may be performed on the reconstructed object to fill in any holes produced during the custom blending operation. The use of a stencil ensures that only fragments inside the holes are filled. In particular embodiments, in addition to meshlets and RGB data, a server may provide a shadow texture to a user device, allowing the device to render the shadow texture into the reconstructed image of the object. A server may render the shadow texture as a non-view-dependent global shadow texture so only a single shadow texture is rendered for the object. During the reconstruction process, the global shadow texture may have to be transformed or reshaped based on the user's viewpoint to match the object in the reconstructed image. The global shadow texture may be rendered into the reconstructed image during the custom blending operation, or in a separate operation. For example, FIG. 3A illustrates a global shadow texture 330 rendered into the reconstructed image 350.

Figure 4:
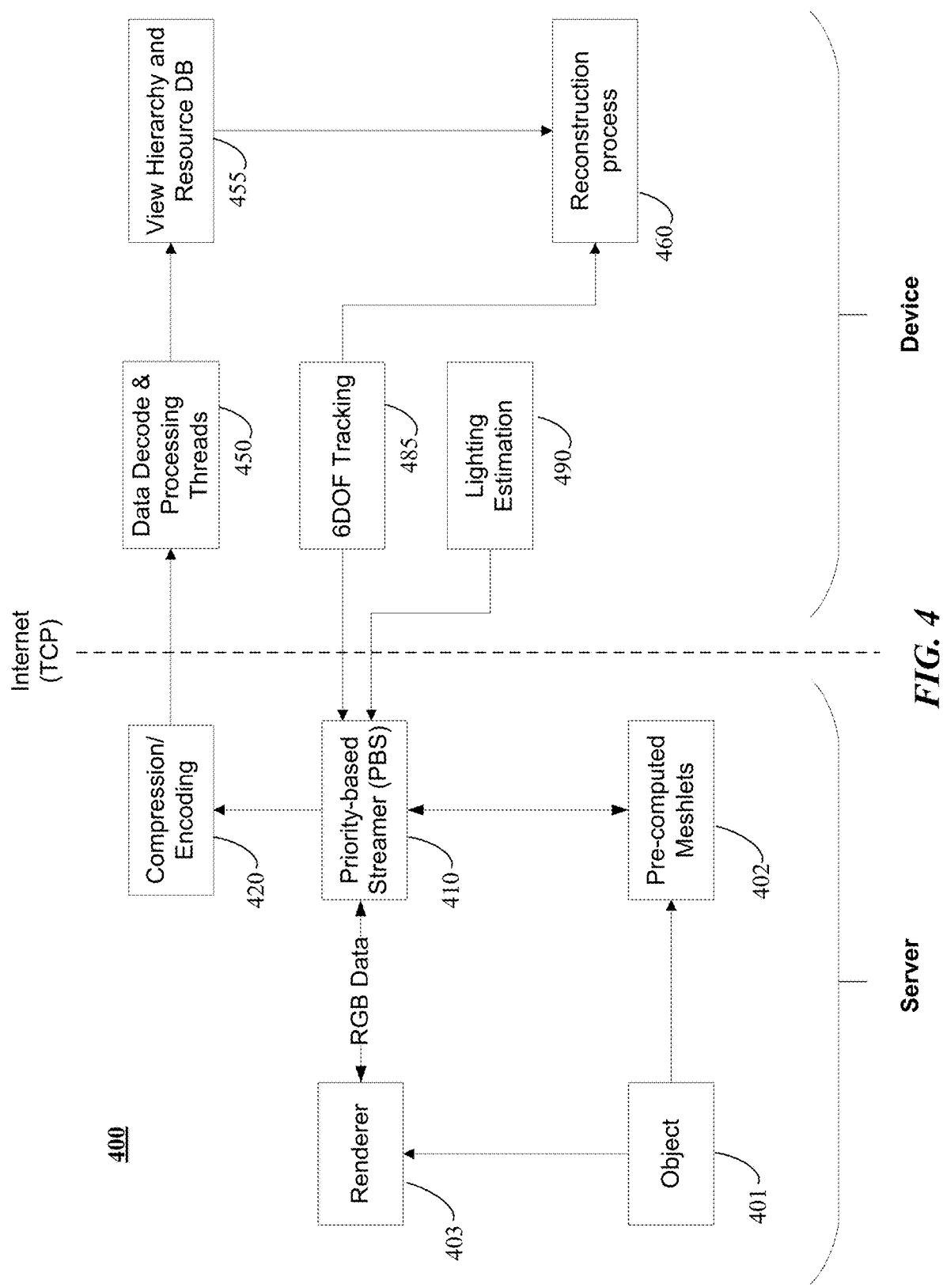
FIG. 4 illustrates a diagram of a server that generates the rendering data and a device that performs the reconstruction process.

FIG. 4 illustrates a flow diagram 400 between a server that generates the rendering data (e.g., meshlets and RGB data) and a device that performs the reconstruction process. In particular embodiments, as illustrated in FIG. 4, the server may pre-compute an object's 401 meshlets and store the pre-computed meshlets 402 for later use since, generally, the geometry of objects does not change. In particular embodiments, the server may use a renderer 403 to render the RGB data and shadow texture of an object. In contrast to meshlets, RGB data and shadow texture are rendered not only based on the viewpoints but also based on the lighting conditions in the virtual environment. This means that RGB data and shadow texture may need to be rendered and updated much more frequently than meshlets since lighting conditions generally change a lot more frequently than an object's geometry. Thus, in particular embodiments, the renderer 403 may render the RGB data the shadow texture at run-time, as needed, instead of pre-rendering them. In other embodiments, the renderer 403 may pre-render the RGB data and shadow texture in a similar fashion to meshlets, for example, when the lighting conditions do not change frequently.

In particular embodiments, a priority-based streamer (PBS) 410 may determine the viewpoints that are most relevant to a user based on the user's position and trajectory in the virtual environment. For example, the PBS 410 may determine the user's current position and trajectory based on six degrees of freedom (6DOF) tracking information 485 received from the user device. Based on the user's position and trajectory, the PBS 410 may identify viewpoints that the user will likely need for reconstructing an object, which may include viewpoints beyond the three closest viewpoints, e.g., primary views. In particular embodiment, the PBS 410 may prioritize the viewpoints so the user can be provided with more relevant rendering data (e.g., meshlets and RGB data) before less relevant rendering data. For example, the PBS 410 may prioritize the viewpoints based on viewpoints that the user necessarily needs, viewpoints that the user will likely need, and viewpoints that the user may need. Upon identifying the viewpoints relevant to the user, the PBS 410 may request the renderer 403 to render the RGB data for the identified viewpoints. Once the RGB data is rendered for the identified viewpoints, the PBS 410 may provide the RGB data and corresponding pre-computed meshlets to the compression/encoding processor 420 for transmission. In particular embodiments, RGB data may be compressed according to a video compression standard based on block-oriented, motion-compensated integer-DCT coding, such as Advanced Video Encoding ("AVC") or H.264. Meshlets may be compressed based on a custom meshlet compression algorithm that leverages the uniform spacing of the meshlet vertices. The compressed data may then be provided to a user device.

In particular embodiments, the compressed data received by a user device may be decoded and processed by the data decode and processing threads 450. Once decoded and processed, the data may be provided to the view hierarchy and resource database 455 of the user device. In particular embodiments, a user device may store and maintain its own view hierarchy of the object, thus when meshlets and RGB data for certain viewpoints are received, the device updates the corresponding viewpoints with the received information. In particular embodiments, a user device may utilize a local cache and store meshlets and RGB data received from a server so they can be used for future reconstruction processes.

Figure 5:
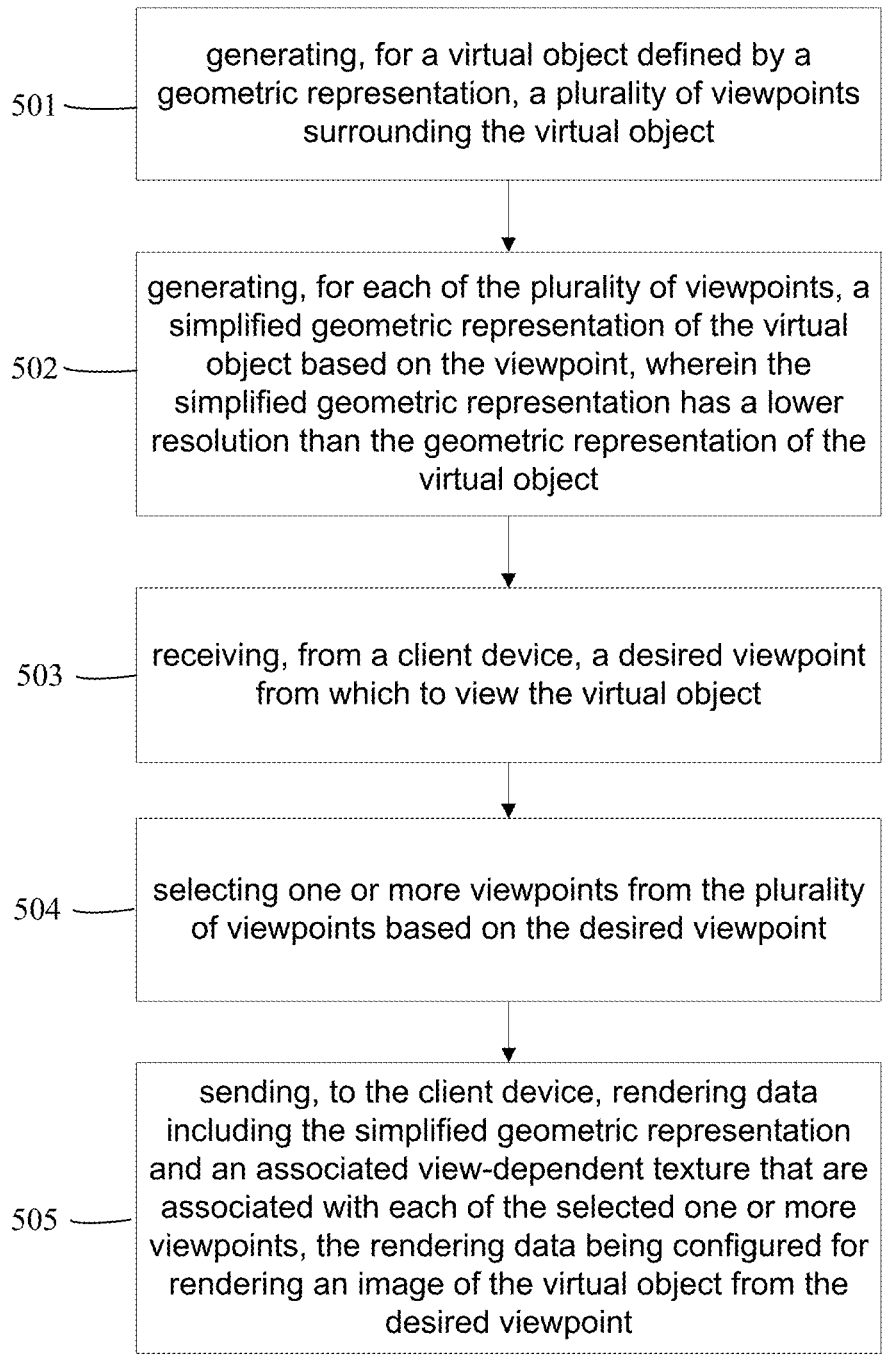
FIG. 5 illustrates an example method for generating a view hierarchy of a virtual object.

FIG. 5 illustrates an example method 500 for generating a view hierarchy of an object. The method may begin at step 501 by generating, for a virtual object defined by a geometric representation, a plurality of viewpoints surrounding the virtual object. At step 502, the method may continue by generating, for each of the plurality of viewpoints, a simplified geometric representation of the virtual object based on the viewpoint, wherein the simplified geometric representation has a lower resolution than the geometric representation of the virtual object. At step 503, the method may continue by receiving, from a client device, a desired viewpoint from which to view the virtual object. At step 504, the method may continue by selecting one or more viewpoints from the plurality of viewpoints based on the desired viewpoint. At step 505, the method may continue by sending, to the client device, rendering data including the simplified geometric representation and an associated view-dependent texture that are associated with each of the selected one or more viewpoints, the rendering data being configured for rendering an image of the virtual object from the desired viewpoint. Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for generating a view hierarchy of an object, this disclosure contemplates any suitable method for generating a view hierarchy of an object including any suitable steps, which may include all, some, or none of the steps of the method of FIG. 5, where appropriate.

Figure 6:
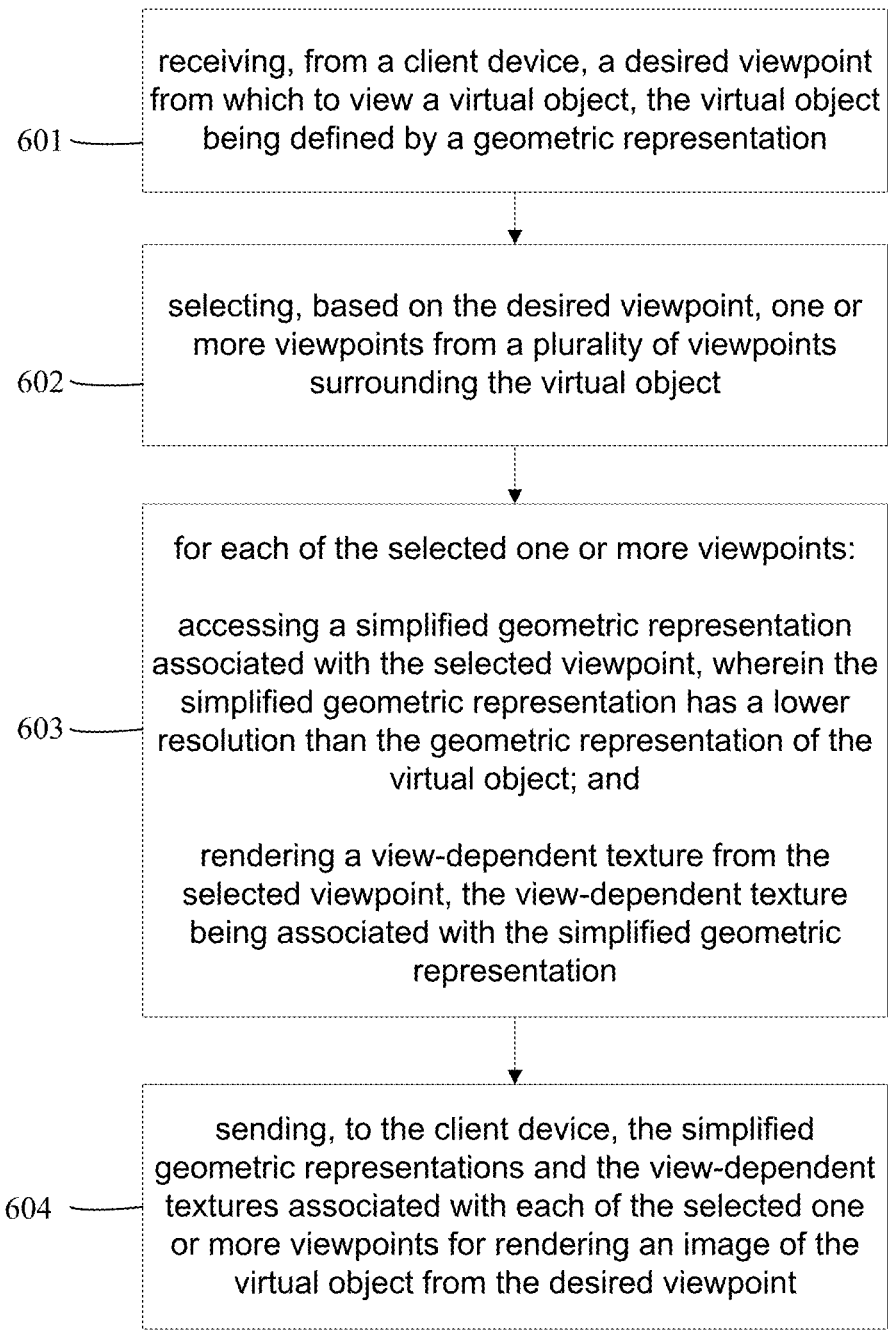
FIG. 6 illustrates an example method for determining viewpoints that are relevant to a user and providing rendering data associated with the relevant viewpoints.

FIG. 6 illustrates an example method 600 for determining viewpoints that are relevant to a user and providing rendering data associated with the relevant viewpoints. The method may begin at step 601 by receiving, from a client device, a desired viewpoint from which to view a virtual object, the virtual object being defined by a geometric representation. At step 602, the method may continue by selecting, based on the desired viewpoint, one or more viewpoints from a plurality of viewpoints surrounding the virtual object. At step 603, the method may continue by, for each of the selected one or more viewpoints: accessing a simplified geometric representation associated with the selected viewpoint, wherein the simplified geometric representation has a lower resolution than the geometric representation of the virtual object; and rendering a view-dependent texture from the selected viewpoint, the view-dependent texture being associated with the simplified geometric representation. At step 604, the method may continue by sending, to the client device, the simplified geometric representations and the view-dependent textures associated with each of the selected one or more viewpoints for rendering an image of the virtual object from the desired viewpoint. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for determining viewpoints that are relevant to a user and providing meshlet data and RGB data associated with the relevant viewpoints to a device associated with the user, this disclosure contemplates any suitable method for determining viewpoints that are relevant to a user and providing meshlet data and RGB data associated with the relevant viewpoints to a device associated with the user including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
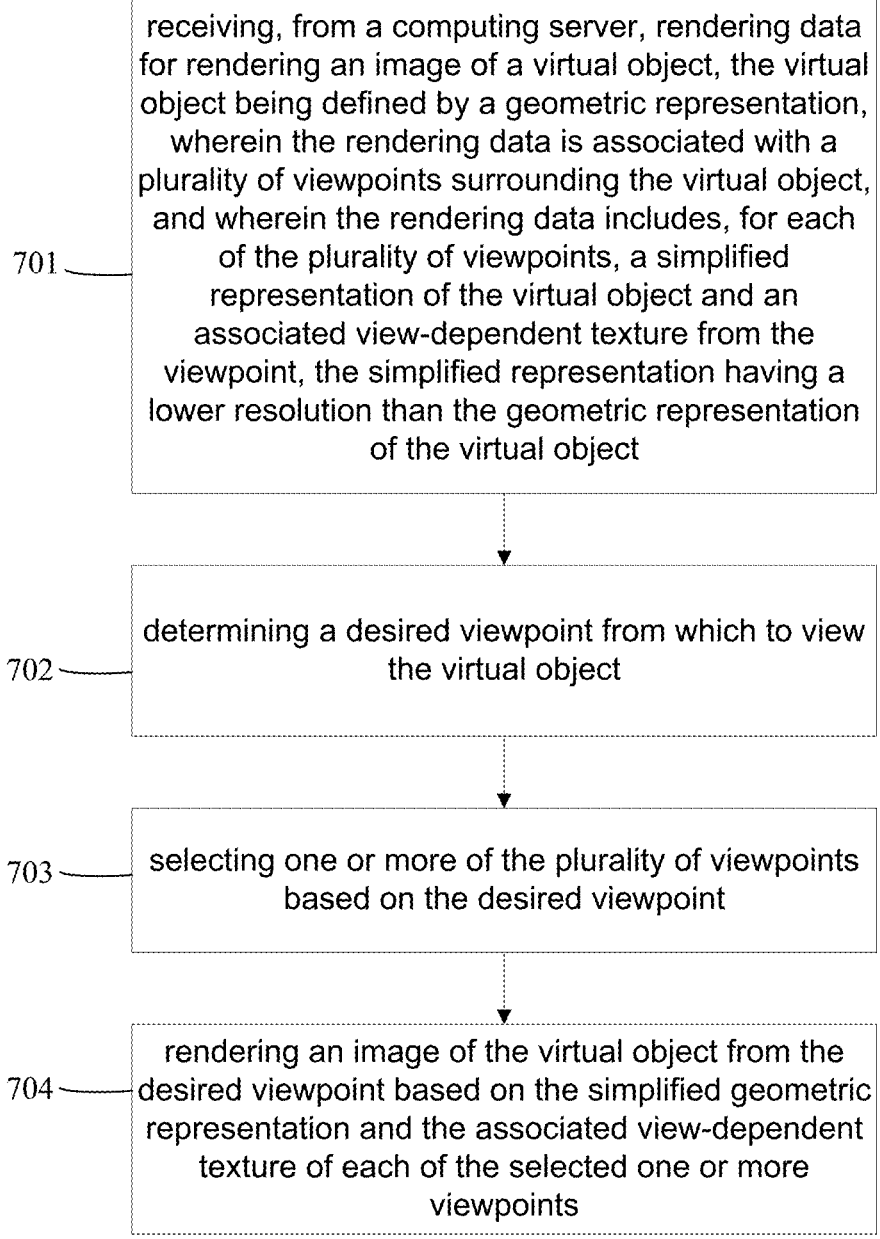
FIG. 7 illustrates an example method for rendering an image of a virtual object based on rendering data.

FIG. 7 illustrates an example method 700 for rendering an image of a virtual object based on simplified geometric representations and view-dependent textures of the object. The method may begin at step 701 by receiving, from a computing server, rendering data for rendering an image of a virtual object, the virtual object being defined by a geometric representation, wherein the rendering data is associated with a plurality of viewpoints surrounding the virtual object, and wherein the rendering data includes, for each of the plurality of viewpoints, a simplified representation of the virtual object and an associated view-dependent texture from the viewpoint, the simplified representation having a lower resolution than the geometric representation of the virtual object. At step 702, the method may continue by determining a desired viewpoint from which to view the virtual object. At step 703, the method may continue by selecting one or more of the plurality of viewpoints based on the desired viewpoint. At step 704, the method may continue by rendering an image of the virtual object from the desired viewpoint based on the simplified geometric representation and the associated view-dependent texture of each of the selected one or more viewpoints. Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for reconstructing an object locally on a device, this disclosure contemplates any suitable method for reconstructing an object locally on a device including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Machine learning techniques based on a neural radiance field (NeRF), have been successful in learning models of the geometrical and reflectance properties of an object to be rendered from multiple photographs taken from different positions. However, rendering a novel view directly from such techniques is computationally intensive and takes too long to be useful for real-time AR/VR application. Thus, the disclosure of this Application discloses methods that combine post-processing of a learned machine-learning (ML) model, such as a learned radiance field, with a rendering technique that facilitates real-time display of novel views of the original object or scene. These methods may involve generating a view hierarchy, or various viewpoints surrounding a virtual object, based on the post-processing of a learned radiance field.

Figure 8:
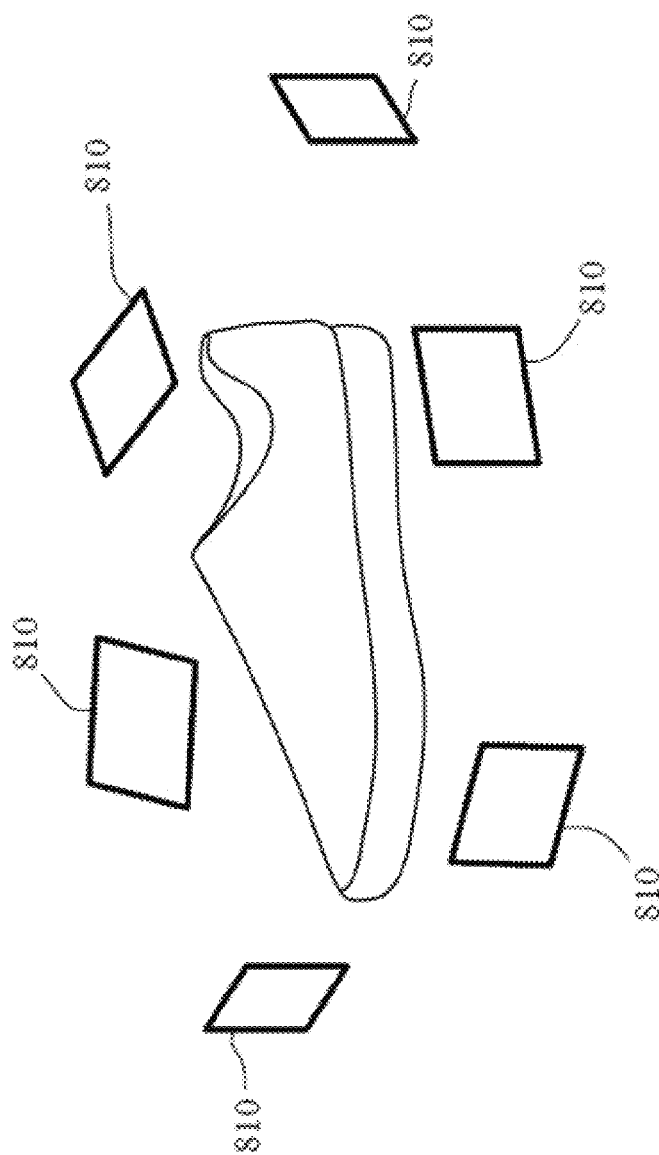
FIG. 8 illustrates various camera poses from which input images of an object may be captured from to train a machine learning model.

In particular embodiment, a ML model is trained based on techniques of NeRF to generates novel views of complex scenes, or objects, by optimizing an underlying continuous volumetric scene function using a sparse set of input views. For example, FIG. 8 illustrates various camera poses 810 from which input images of an object may be captured from. Using such input images, a neural radiance field representation, or an MLP network, may be generated to output view-dependent images. The learned radiance field representation of an object is represented by as a continuous 5D function 840 that outputs the radiance emitted in each direction ($\theta$, $\Phi$) at each point (x, y, z) in space and a density at each point based on a differential opacity controlling how much radiance is accumulated by a ray passing through (x, y, z). In other words, the continuous scene can be described as a 5D vector-valued function 840 (e.g., MLP network $F_\Theta$) whose input is a 3D location x=(x, y, z) and 2D viewing direction ($\theta$, $\Phi$) and whose output is an emitted color c=(r, g, b) and volume density (a). In some embodiments, depth maps can further be computed as the expected termination of each camera ray in the encoded volume.

Figure 9:
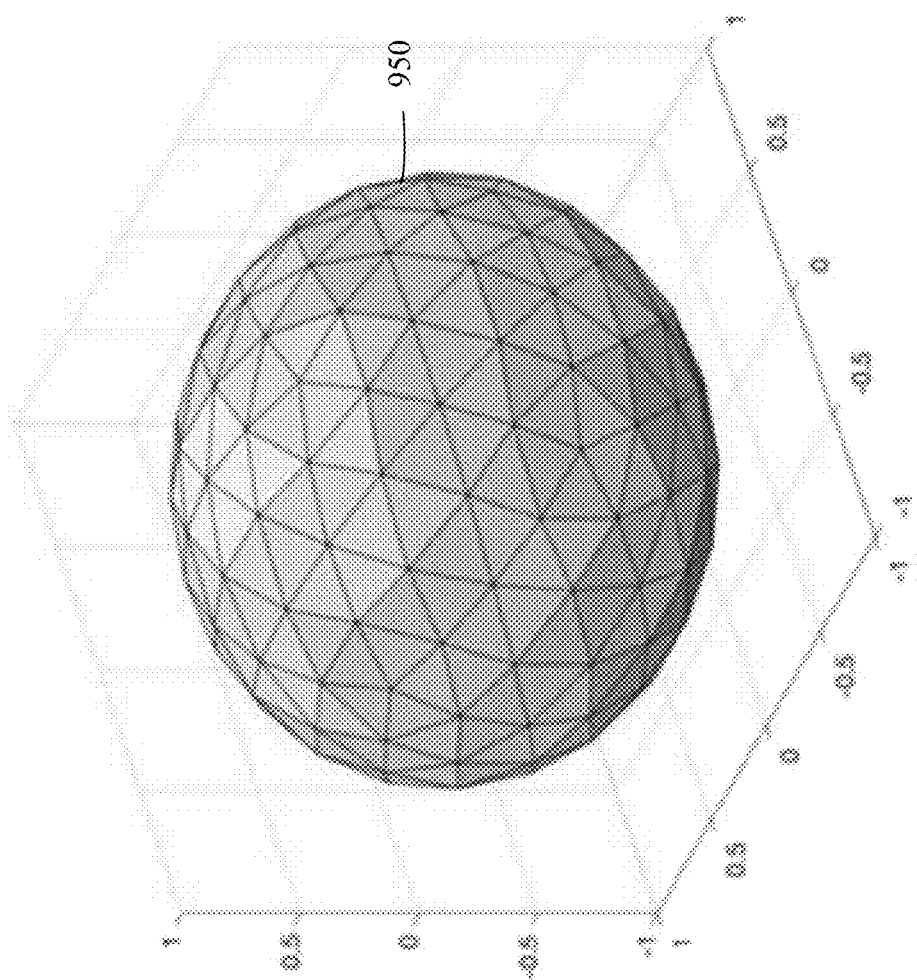
FIG. 9 illustrates an example geodesic structure comprising viewpoints surrounding an object.

In particular embodiments, a view hierarchy, or various viewpoints surrounding a virtual object, is generated based on the post-processing of a learned radiance field. For example, FIG. 9 illustrates an example set of viewpoints centered around an object (not visible in the figure). The location of each of the vertices of the geodesic structure 950 (e.g., view hierarchy) shown in FIG. 9 is a location where a viewpoint may be located at. After a neural radiance field representation of an object is generated, the learned neural radiance field may be queried with the coordinate point of the viewpoints of the geodesic structure 950 (x, y, z) and corresponding view directions ($\theta$; $\Phi$) to obtain RGB views (e.g., RGB images) of the object from those viewpoints. Then, depth maps can be computed for each of the RGB images based on the expected termination of each camera ray in the encoded volume to obtain RGB+D (depth) images.

Figure 10:
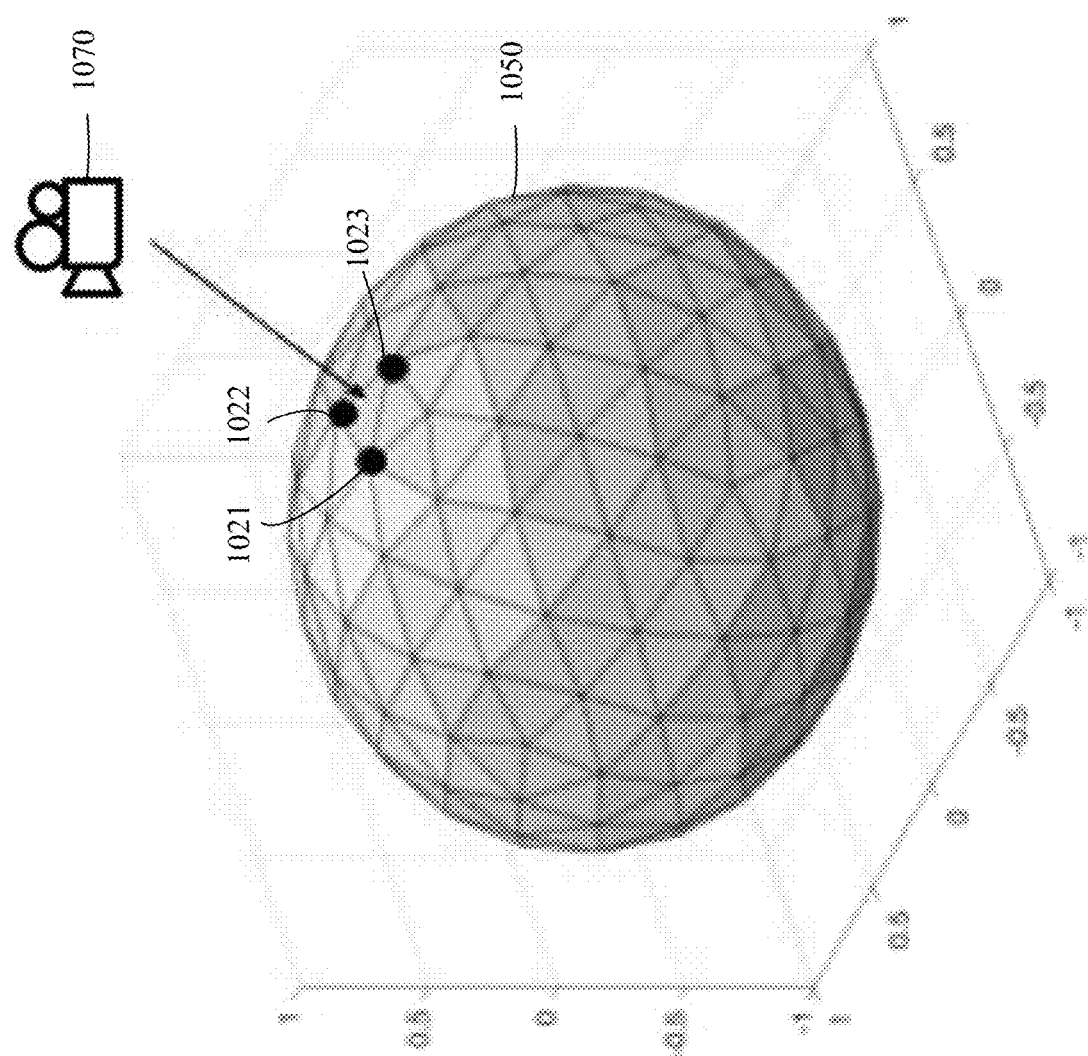
FIG. 10 illustrates another example geodesic structure comprising viewpoints surrounding an object.

The reconstruction process of an object is performed locally by a user device based on viewpoints surrounding the object (e.g., geodesic structure 950, or view hierarchy). In particular embodiments, the reconstruction process involves determining a user's viewpoint with respect to the view hierarchy of the object by projecting a ray from the user's viewpoint to the center of the object and determining the point at which the ray intersects the view hierarchy (referred to as the "hit point"). This process is similar to the process described above in reference to FIG. 2. FIG. 10 illustrates the same process except in reference to the geodesic structure 1050. For example, to determine a novel view from a camera's viewpoint 1070, a ray is projected to the center point of the object (e.g., geodesic structure 1050). The point at which the ray intersects the geodesic structure 1050 is referred to as the hit point. Next, the view triangle enclosing the hit point 250 is identified and the three viewpoints forming the view triangle are selected as "primary views" (e.g., viewpoints 1021, 1022, 1023). Then, the barycentric coordinate of the user's viewpoint 210 with respect to the view triangle (formed by the primary views) is determined. The viewpoints associated with the primary views are then each reprojected from the camera's viewpoint 1070, for example, in separate framebuffers. Then, the reprojections are combined/blended together in a substantially a similar method as the one described above in reference to FIGS. 3A-3B (e.g., based the barycentric coordinate of the user's viewpoint with respect to the primary views), resulting in an image of the object from the camera's viewpoint 1070.

FIG. 11 illustrates an example method 1100 for rendering an image of a virtual object from a desired viewpoint based on images obtained from a machine-learning model, the images being associated with predetermined viewpoints surrounding the object. The method may begin at step 1110 by receiving training data comprising images of an object and associated camera poses from which the images are captured. At step 1120, the method may continue by training, based on the training data, a machine-learning model to take as input a given viewpoint and synthesize an image of a virtual representation of the object as viewed from the given viewpoint. At step 1130, the method may continue by generating, for each of a predetermined plurality of viewpoints surrounding the virtual representation of the object, a view-dependent image of the object as viewed from that viewpoint using the trained machine-learning model. At step 1140, the method may continue by receiving, from a client device, a desired viewpoint from which to view the virtual representation of the object. At step 1150, the method may continue by selecting one or more of the predetermined plurality of viewpoints based on the desired viewpoint. At step 1160, the method may continue by sending, to the client device, the view-dependent images associated with the selected one or more viewpoints for rendering an output image of the virtual representation of the object viewed from the desired viewpoint. Particular embodiments may repeat one or more steps of the method of FIG. 11, where appropriate. Although this disclosure describes and illustrates particular steps of the method of FIG. 11 as occurring in a particular order, this disclosure contemplates any suitable steps of the method of FIG. 11 occurring in any suitable order. Moreover, although this disclosure describes and illustrates an example method for rendering an image of a virtual object from a desired viewpoint based on images obtained from a machine-learning model, this disclosure contemplates any suitable method for rendering an image of a virtual object from a desired viewpoint based on images obtained from a machine-learning model including any suitable steps, which may include all, some, or none of the steps of the method of FIG. 11, where appropriate. Furthermore, although this disclosure describes and illustrates particular components, devices, or systems carrying out particular steps of the method of FIG. 11, this disclosure contemplates any suitable combination of any suitable components, devices, or systems carrying out any suitable steps of the method of FIG. 11.

Figure 12:
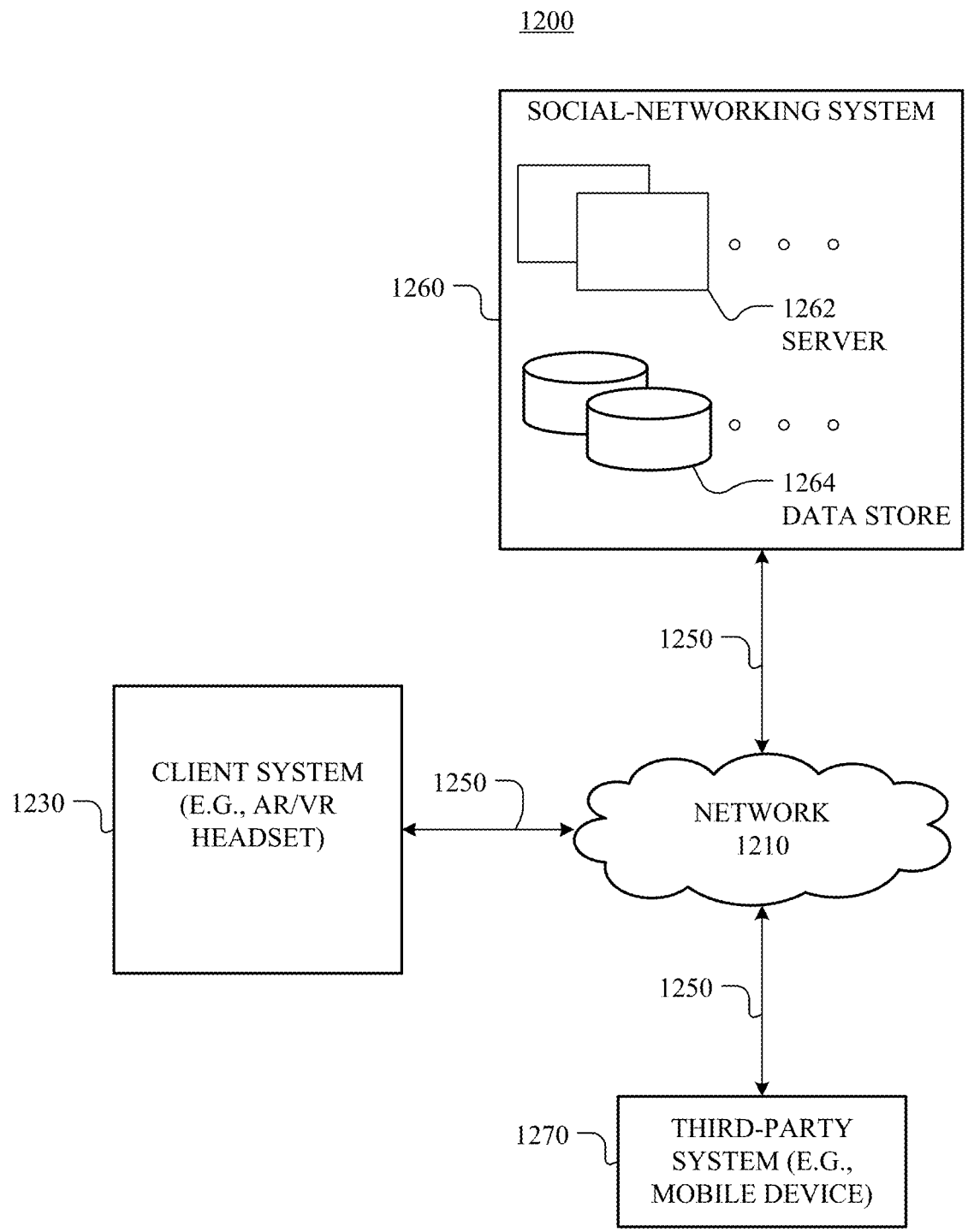
FIG. 12 illustrates an example network environment associated with a social-networking system.

FIG. 12 illustrates an example network environment 1200 associated with a social-networking system. Network environment 1200 includes a client system 1230, a social-networking system 1260, and a third-party system 1270 connected to each other by a network 1210. Although FIG. 12 illustrates a particular arrangement of client system 1230, social-networking system 1260, third-party system 1270, and network 1210, this disclosure contemplates any suitable arrangement of client system 1230, social-networking system 1260, third-party system 1270, and network 1210. As an example and not by way of limitation, two or more of client system 1230, social-networking system 1260, and third-party system 1270 may be connected to each other directly, bypassing network 1210. As another example, two or more of client system 1230, social-networking system 1260, and third-party system 1270 may be physically or logically co-located with each other in whole or in part. For example, an AR/VR headset 1230 may be connected to a local computer or mobile computing device 1270 via short-range wireless communication (e.g., Bluetooth). Moreover, although FIG. 12 illustrates a particular number of client systems 1230, social-networking systems 1260, third-party systems 1270, and networks 1210, this disclosure contemplates any suitable number of client systems 1230, social-networking systems 1260, third-party systems 1270, and networks 1210. As an example and not by way of limitation, network environment 1200 may include multiple client system 1230, social-networking systems 1260, third-party systems 1270, and networks 1210.

This disclosure contemplates any suitable network 1210. As an example and not by way of limitation, one or more portions of network 1210 may include a short-range wireless network (e.g., Bluetooth, Zigbee, etc.), an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1210 may include one or more networks 1210.

Links 1250 may connect client system 1230, social-networking system 1260, and third-party system 1270 to communication network 1210 or to each other. This disclosure contemplates any suitable links 1250. In particular embodiments, one or more links 1250 include one or more wireline (such as for example Digital Subscriber Line (DSL) or Data Over Cable Service Interface Specification (DOCSIS)), wireless (such as for example Wi-Fi, Worldwide Interoperability for Microwave Access (WiMAX), Bluetooth), or optical (such as for example Synchronous Optical Network (SONET) or Synchronous Digital Hierarchy (SDH)) links. In particular embodiments, one or more links 1250 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 1250, or a combination of two or more such links 1250. Links 1250 need not necessarily be the same throughout network environment 1200. One or more first links 1250 may differ in one or more respects from one or more second links 1250.

In particular embodiments, client system 1230 may be an electronic device including hardware, software, or embedded logic components or a combination of two or more such components and capable of carrying out the appropriate functionalities implemented or supported by client system 1230. As an example and not by way of limitation, a client system 1230 may include a computer system such as a VR/AR headset, desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 1230. A client system 1230 may enable a network user at client system 1230 to access network 1210. A client system 1230 may enable its user to communicate with other users at other client systems 1230.

In particular embodiments, social-networking system 1260 may be a network-addressable computing system that can host an online social network. Social-networking system 1260 may generate, store, receive, and send social-networking data, such as, for example, user-profile data, concept-profile data, social-graph information, or other suitable data related to the online social network. Social-networking system 1260 may be accessed by the other components of network environment 1200 either directly or via network 1210. As an example and not by way of limitation, client system 1230 may access social-networking system 1260 using a web browser, or a native application associated with social-networking system 1260 (e.g., a mobile social-networking application, a messaging application, another suitable application, or any combination thereof) either directly or via network 1210. In particular embodiments, social-networking system 1260 may include one or more servers 1262. Each server 1262 may be a unitary server or a distributed server spanning multiple computers or multiple datacenters. Servers 1262 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 1262 may include hardware, software, or embedded logic components or a combination of two or more such components for carrying out the appropriate functionalities implemented or supported by server 1262. In particular embodiments, social-networking system 1260 may include one or more data stores 1264. Data stores 1264 may be used to store various types of information. In particular embodiments, the information stored in data stores 1264 may be organized according to specific data structures. In particular embodiments, each data store 1264 may be a relational, columnar, correlation, or other suitable database. Although this disclosure describes or illustrates particular types of databases, this disclosure contemplates any suitable types of databases. Particular embodiments may provide interfaces that enable a client system 1230, a social-networking system 1260, or a third-party system 1270 to manage, retrieve, modify, add, or delete, the information stored in data store 1264.

In particular embodiments, social-networking system 1260 may store one or more social graphs in one or more data stores 1264. In particular embodiments, a social graph may include multiple nodes—which may include multiple user nodes (each corresponding to a particular user) or multiple concept nodes (each corresponding to a particular concept)—and multiple edges connecting the nodes. Social-networking system 1260 may provide users of the online social network the ability to communicate and interact with other users. In particular embodiments, users may join the online social network via social-networking system 1260 and then add connections (e.g., relationships) to a number of other users of social-networking system 1260 to whom they want to be connected. Herein, the term "friend" may refer to any other user of social-networking system 1260 with whom a user has formed a connection, association, or relationship via social-networking system 1260.

In particular embodiments, social-networking system 1260 may provide users with the ability to take actions on various types of items or objects, supported by social-networking system 1260. As an example and not by way of limitation, the items and objects may include groups or social networks to which users of social-networking system 1260 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 1260 or by an external system of third-party system 1270, which is separate from social-networking system 1260 and coupled to social-networking system 1260 via a network 1210.

In particular embodiments, social-networking system 1260 may be capable of linking a variety of entities. As an example and not by way of limitation, social-networking system 1260 may enable users to interact with each other as well as receive content from third-party systems 1270 or other entities, or to allow users to interact with these entities through an application programming interfaces (API) or other communication channels.

In particular embodiments, a third-party system 1270 may include a local computing device that is communicatively coupled to the client system 1230. For example, if the client system 1230 is an AR/VR headset, the third-party system 1270 may be a local laptop configured to perform the necessary graphics rendering and provide the rendered results to the AR/VR headset 1230 for subsequent processing and/or display. In particular embodiments, the third-party system 1270 may execute software associated with the client system 1230 (e.g., a rendering engine). The third-party system 1270 may generate sample datasets with sparse pixel information of video frames and send the sparse data to the client system 1230. The client system 1230 may then generate frames reconstructed from the sample datasets.

In particular embodiments, the third-party system 1270 may also include one or more types of servers, one or more data stores, one or more interfaces, including but not limited to APIs, one or more web services, one or more content sources, one or more networks, or any other suitable components, e.g., that servers may communicate with. A third-party system 1270 may be operated by a different entity from an entity operating social-networking system 1260. In particular embodiments, however, social-networking system 1260 and third-party systems 1270 may operate in conjunction with each other to provide social-networking services to users of social-networking system 1260 or third-party systems 1270. In this sense, social-networking system 1260 may provide a platform, or backbone, which other systems, such as third-party systems 1270, may use to provide social-networking services and functionality to users across the Internet.

In particular embodiments, a third-party system 1270 may include a third-party content object provider (e.g., including sparse sample datasets described herein). A third-party content object provider may include one or more sources of content objects, which may be communicated to a client system 1230. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 1260 also includes user-generated content objects, which may enhance a user's interactions with social-networking system 1260. User-generated content may include anything a user can add, upload, send, or "post" to social-networking system 1260. As an example and not by way of limitation, a user communicates posts to social-networking system 1260 from a client system 1230. Posts may include data such as status updates or other textual data, location information, photos, videos, links, music or other similar data or media. Content may also be added to social-networking system 1260 by a third-party through a "communication channel," such as a newsfeed or stream.

In particular embodiments, social-networking system 1260 may include a variety of servers, sub-systems, programs, modules, logs, and data stores. In particular embodiments, social-networking system 1260 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 1260 may also include suitable components such as network interfaces, security mechanisms, load balancers, failover servers, management-and-network-operations consoles, other suitable components, or any suitable combination thereof. In particular embodiments, social-networking system 1260 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 1260 to one or more client systems 1230 or one or more third-party system 1270 via network 1210. The web server may include a mail server or other messaging functionality for receiving and routing messages between social-networking system 1260 and one or more client systems 1230. An API-request server may allow a third-party system 1270 to access information from social-networking system 1260 by calling one or more APIs. An action logger may be used to receive communications from a web server about a user's actions on or off social-networking system 1260. In conjunction with the action log, a third-party-content-object log may be maintained of user exposures to third-party-content objects. A notification controller may provide information regarding content objects to a client system 1230. Information may be pushed to a client system 1230 as notifications, or information may be pulled from client system 1230 responsive to a request received from client system 1230. Authorization servers may be used to enforce one or more privacy settings of the users of social-networking system 1260. A privacy setting of a user determines how particular information associated with a user can be shared. The authorization server may allow users to opt in to or opt out of having their actions logged by social-networking system 1260 or shared with other systems (e.g., third-party system 1270), such as, for example, by setting appropriate privacy settings. Third-party-content-object stores may be used to store content objects received from third parties, such as a third-party system 1270. Location stores may be used for storing location information received from client systems 1230 associated with users. Advertisement-pricing modules may combine social information, the current time, location information, or other suitable information to provide relevant advertisements, in the form of notifications, to a user.

Figure 13:
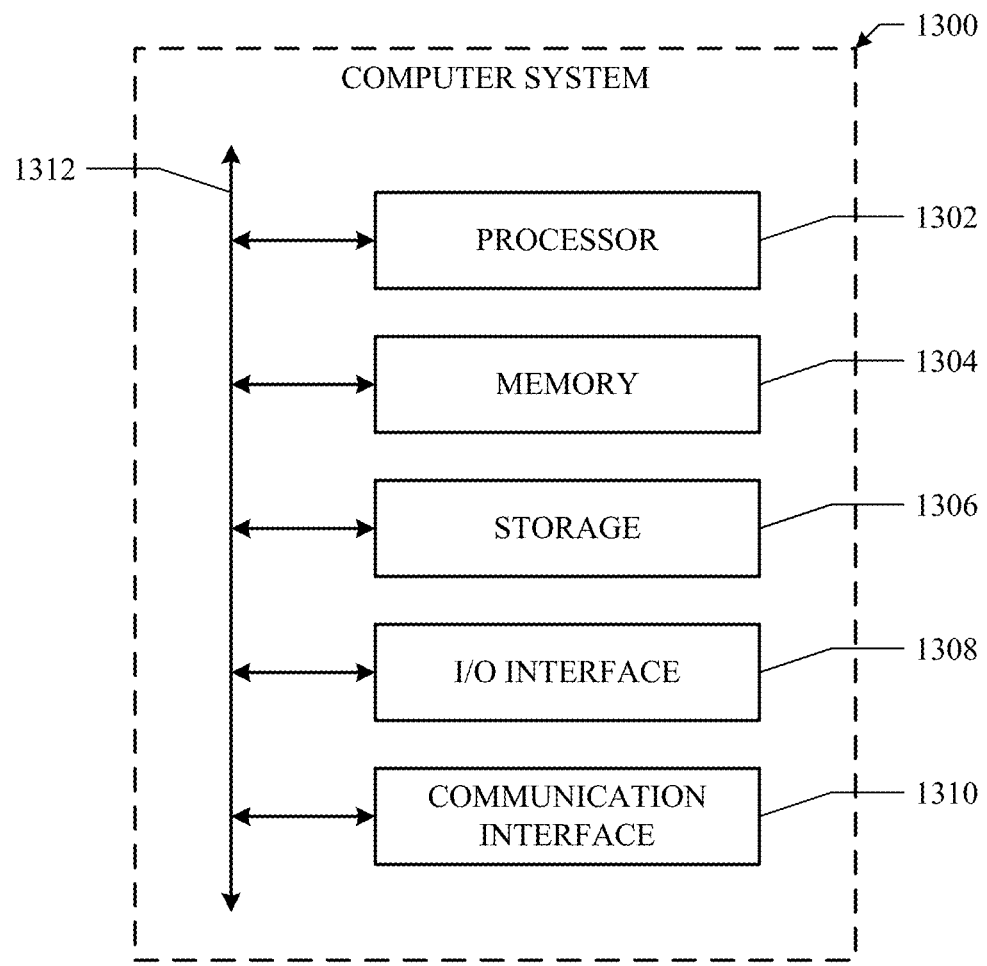
FIG. 13 illustrates an example computer system.

FIG. 13 illustrates an example computer system 1300. In particular embodiments, one or more computer systems 1300 perform one or more steps of one or more methods described or illustrated herein. In particular embodiments, one or more computer systems 1300 provide functionality described or illustrated herein. In particular embodiments, software running on one or more computer systems 1300 performs one or more steps of one or more methods described or illustrated herein or provides functionality described or illustrated herein. Particular embodiments include one or more portions of one or more computer systems 1300. Herein, reference to a computer system may encompass a computing device, and vice versa, where appropriate. Moreover, reference to a computer system may encompass one or more computer systems, where appropriate.

This disclosure contemplates any suitable number of computer systems 1300. This disclosure contemplates computer system 1300 taking any suitable physical form. As example and not by way of limitation, computer system 1300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1300 may include one or more computer systems 1300; be unitary or distributed; span multiple locations; span multiple machines; span multiple data centers; or reside in a cloud, which may include one or more cloud components in one or more networks. Where appropriate, one or more computer systems 1300 may perform without substantial spatial or temporal limitation one or more steps of one or more methods described or illustrated herein. As an example and not by way of limitation, one or more computer systems 1300 may perform in real time or in batch mode one or more steps of one or more methods described or illustrated herein. One or more computer systems 1300 may perform at different times or at different locations one or more steps of one or more methods described or illustrated herein, where appropriate.

In particular embodiments, computer system 1300 includes a processor 1302, memory 1304, storage 1306, an input/output (I/O) interface 1308, a communication interface 1310, and a bus 1312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1302 includes hardware for executing instructions, such as those making up a computer program. As an example and not by way of limitation, to execute instructions, processor 1302 may retrieve (or fetch) the instructions from an internal register, an internal cache, memory 1304, or storage 1306; decode and execute them; and then write one or more results to an internal register, an internal cache, memory 1304, or storage 1306. In particular embodiments, processor 1302 may include one or more internal caches for data, instructions, or addresses. This disclosure contemplates processor 1302 including any suitable number of any suitable internal caches, where appropriate. As an example and not by way of limitation, processor 1302 may include one or more instruction caches, one or more data caches, and one or more translation lookaside buffers (TLBs). Instructions in the instruction caches may be copies of instructions in memory 1304 or storage 1306, and the instruction caches may speed up retrieval of those instructions by processor 1302. Data in the data caches may be copies of data in memory 1304 or storage 1306 for instructions executing at processor 1302 to operate on; the results of previous instructions executed at processor 1302 for access by subsequent instructions executing at processor 1302 or for writing to memory 1304 or storage 1306; or other suitable data. The data caches may speed up read or write operations by processor 1302. The TLBs may speed up virtual-address translation for processor 1302. In particular embodiments, processor 1302 may include one or more internal registers for data, instructions, or addresses. This disclosure contemplates processor 1302 including any suitable number of any suitable internal registers, where appropriate. Where appropriate, processor 1302 may include one or more arithmetic logic units (ALUs); be a multi-core processor; or include one or more processors 1302. Although this disclosure describes and illustrates a particular processor, this disclosure contemplates any suitable processor.

In particular embodiments, memory 1304 includes main memory for storing instructions for processor 1302 to execute or data for processor 1302 to operate on. As an example and not by way of limitation, computer system 1300 may load instructions from storage 1306 or another source (such as, for example, another computer system 1300) to memory 1304. Processor 1302 may then load the instructions from memory 1304 to an internal register or internal cache. To execute the instructions, processor 1302 may retrieve the instructions from the internal register or internal cache and decode them. During or after execution of the instructions, processor 1302 may write one or more results (which may be intermediate or final results) to the internal register or internal cache. Processor 1302 may then write one or more of those results to memory 1304. In particular embodiments, processor 1302 executes only instructions in one or more internal registers or internal caches or in memory 1304 (as opposed to storage 1306 or elsewhere) and operates only on data in one or more internal registers or internal caches or in memory 1304 (as opposed to storage 1306 or elsewhere). One or more memory buses (which may each include an address bus and a data bus) may couple processor 1302 to memory 1304. Bus 1312 may include one or more memory buses, as described below. In particular embodiments, one or more memory management units (MMUs) reside between processor 1302 and memory 1304 and facilitate accesses to memory 1304 requested by processor 1302. In particular embodiments, memory 1304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1304 may include one or more memories 1304, where appropriate. Although this disclosure describes and illustrates particular memory, this disclosure contemplates any suitable memory.

In particular embodiments, storage 1306 includes mass storage for data or instructions. As an example and not by way of limitation, storage 1306 may include a hard disk drive (HDD), a floppy disk drive, flash memory, an optical disc, a magneto-optical disc, magnetic tape, or a Universal Serial Bus (USB) drive or a combination of two or more of these. Storage 1306 may include removable or non-removable (or fixed) media, where appropriate. Storage 1306 may be internal or external to computer system 1300, where appropriate. In particular embodiments, storage 1306 is non-volatile, solid-state memory. In particular embodiments, storage 1306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1306 taking any suitable physical form. Storage 1306 may include one or more storage control units facilitating communication between processor 1302 and storage 1306, where appropriate. Where appropriate, storage 1306 may include one or more storages 1306. Although this disclosure describes and illustrates particular storage, this disclosure contemplates any suitable storage.

In particular embodiments, I/O interface 1308 includes hardware, software, or both, providing one or more interfaces for communication between computer system 1300 and one or more I/O devices. Computer system 1300 may include one or more of these I/O devices, where appropriate. One or more of these I/O devices may enable communication between a person and computer system 1300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1308 for them. Where appropriate, I/O interface 1308 may include one or more device or software drivers enabling processor 1302 to drive one or more of these I/O devices. I/O interface 1308 may include one or more I/O interfaces 1308, where appropriate. Although this disclosure describes and illustrates a particular I/O interface, this disclosure contemplates any suitable I/O interface.

In particular embodiments, communication interface 1310 includes hardware, software, or both providing one or more interfaces for communication (such as, for example, packet-based communication) between computer system 1300 and one or more other computer systems 1300 or one or more networks. As an example and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1310 for it. As an example and not by way of limitation, computer system 1300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1300 may include any suitable communication interface 1310 for any of these networks, where appropriate. Communication interface 1310 may include one or more communication interfaces 1310, where appropriate. Although this disclosure describes and illustrates a particular communication interface, this disclosure contemplates any suitable communication interface.

In particular embodiments, bus 1312 includes hardware, software, or both coupling components of computer system 1300 to each other. As an example and not by way of limitation, bus 1312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1312 may include one or more buses 1312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing server:
    receiving training data comprising images of an object and associated camera poses from which the images are captured;
    training, based on the training data, a machine-learning model to take as input a given viewpoint and synthesize an image of a virtual representation of the object as viewed from the given viewpoint;
    querying the trained machine-learning model with a predetermined plurality of viewpoints surrounding the virtual representation of the object;
    generating, for each of the predetermined plurality of viewpoints surrounding the virtual representation of the object, a view-dependent image of the object as viewed from that viewpoint using the trained machine-learning model;
    receiving, from a client device, a desired viewpoint from which to view the virtual representation of the object;
    selecting three or more of the predetermined plurality of viewpoints based on that are surrounding the desired viewpoint; and
    sending, to the client device, the view-dependent images associated with the selected three or more viewpoints for rendering an output image of the virtual representation of the object viewed from the desired viewpoint.

2. The method of claim 1, wherein the machine-learning model is a neural network model trained to learn a neural radiance field of the object.

3. The method of claim 1, wherein each of the generated view-dependent images represents an image of the virtual representation of the object as viewed from a coordinate point (x, y, z) with a view direction (θ,Φ).

4. The method of claim 1, wherein selecting the three or more of the predetermined plurality of viewpoints based on the desired viewpoint comprises:
    prioritizing three or more of the predetermined plurality of viewpoints based on distances between the desired viewpoint and each of the predetermined plurality of viewpoints; and
    selecting the three or more viewpoints from the predetermined plurality of viewpoints based on their prioritization.

5. The method of claim 4, wherein prioritizing the three or more of the predetermined plurality of viewpoints is further based on a trajectory of a virtual camera associated with the desired viewpoint.

6. The method of claim 1, wherein rendering the output image of the virtual representation of the object as viewed from the desired viewpoint comprises:
    reprojecting the view-dependent images associated with the selected three or more viewpoints from the desired viewpoint.

7. The method of claim 1, wherein generating, for each of the predetermined plurality of viewpoints surrounding the virtual representation of the object, the view-dependent image of the object as viewed from that viewpoint using the trained machine-learning model is performed prior to receiving, from the client device, the desired viewpoint from which to view the virtual representation of the object.

8. One or more computer-readable non-transitory storage media embodying software that is operable when executed to:
    receive training data comprising images of an object and associated camera poses from which the images are captured;
    train, based on the training data, a machine-learning model to take as input a given viewpoint and synthesize an image of a virtual representation of the object as viewed from the given viewpoint;
    query the trained machine-learning model with a predetermined plurality of viewpoints surrounding the virtual representation of the object generate, for each of the predetermined plurality of viewpoints surrounding the virtual representation of the object, a view-dependent image of the object as viewed from that viewpoint using the trained machine-learning model;

receive, from a client device, a desired viewpoint from which to view the virtual representation of the object;

select three or more of the predetermined plurality of viewpoints based on that are surrounding the desired viewpoint; and send, to the client device, the view-dependent images associated with the selected three or more viewpoints for rendering an output image of the virtual representation of the object viewed from the desired viewpoint.

9. The one or more computer-readable non-transitory storage media of claim 8, wherein the machine-learning model is a neural network model trained to learn a neural radiance field of the object.

10. The one or more computer-readable non-transitory storage media of claim 8, wherein each of the generated view-dependent images represents an image of the virtual representation of the object as viewed from a coordinate point (x, y, z) with a view direction (θ,Φ).

11. The one or more computer-readable non-transitory storage media of claim 8, wherein selecting the three or more of the predetermined plurality of viewpoints based on the desired viewpoint comprises:

prioritizing three or more of the predetermined plurality of viewpoints based on distances between the desired viewpoint and each of the predetermined plurality of viewpoints; and selecting the three or more viewpoints from the predetermined plurality of viewpoints based on their prioritization.

12. The one or more computer-readable non-transitory storage media of claim 11, wherein prioritizing the three or more of the predetermined plurality of viewpoints is further based on a trajectory of a virtual camera associated with the desired viewpoint.

13. The one or more computer-readable non-transitory storage media of claim 8, wherein rendering the output image of the virtual representation of the object as viewed from the desired viewpoint comprises:

reprojecting the view-dependent images associated with the selected three or more viewpoints from the desired viewpoint.

14. The one or more computer-readable non-transitory storage media of claim 8, wherein generating, for each of the predetermined plurality of viewpoints surrounding the virtual representation of the object, the view-dependent image of the object as viewed from that viewpoint using the trained machine-learning model is performed prior to receiving, from the client device, the desired viewpoint from which to view the virtual representation of the object.

15. A system comprising: one or more processors; and one or more computer-readable non-transitory storage media in communication with the one or more processors, the one or more computer-readable non-transitory storage media comprising instructions that when executed by the one or more processors, cause the system to perform:

receive training data comprising images of an object and associated camera poses from which the images are captured;

train, based on the training data, a machine-learning model to take as input a given viewpoint and synthesize an image of a virtual representation of the object as viewed from the given viewpoint;

query the trained machine-learning model with a predetermined plurality of viewpoints surrounding the virtual representation of the object generate, for each of the predetermined plurality of viewpoints surrounding the virtual representation of the object, a view-dependent image of the object as viewed from that viewpoint using the trained machine-learning model;

receive, from a client device, a desired viewpoint from which to view the virtual representation of the object;

select three or more of the predetermined plurality of viewpoints based on that are surrounding the desired viewpoint; and send, to the client device, the view-dependent images associated with the selected three or more viewpoints for rendering an output image of the virtual representation of the object viewed from the desired viewpoint.

16. The system of claim 15, wherein the machine-learning model is a neural network model trained to learn a neural radiance field of the object.

17. The system of claim 15, wherein each of the generated view-dependent images represents an image of the virtual representation of the object as viewed from a coordinate point (x, y, z) with a view direction (θ,Φ).

18. The system of claim 15, wherein selecting the three or more of the predetermined plurality of viewpoints based on the desired viewpoint comprises:

prioritizing three or more of the predetermined plurality of viewpoints based on distances between the desired viewpoint and each of the predetermined plurality of viewpoints; and selecting the three or more viewpoints from the predetermined plurality of viewpoints based on their prioritization.

19. The system of claim 18, wherein prioritizing the three or more of the predetermined plurality of viewpoints is further based on a trajectory of a virtual camera associated with the desired viewpoint.

20. The system of claim 15, wherein rendering the output image of the virtual representation of the object as viewed from the desired viewpoint comprises:

reprojecting the view-dependent images associated with the selected three or more viewpoints from the desired viewpoint.

* * * * *